US010727562B1

(12) United States Patent
Hanson et al.

(10) Patent No.: US 10,727,562 B1
(45) Date of Patent: Jul. 28, 2020

(54) DYNAMIC AUTONOMOUS PIEZOELECTRIC STABILIZER MOUNT

(71) Applicant: AT&T Intellectual Property I, L.P., Atlanta, GA (US)

(72) Inventors: Matthew D. Hanson, Rocklin, CA (US); Daniel Redmond, West Sacramento, CA (US); Charles M. Stahulak, Chicago, IL (US); Dennis Martin, West Sacramento, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/391,493

(22) Filed: Apr. 23, 2019

(51) Int. Cl.
*H01Q 1/00* (2006.01)
*H01Q 1/12* (2006.01)
*H04B 17/21* (2015.01)
*H01Q 3/00* (2006.01)
*H04B 17/318* (2015.01)
*H01Q 3/12* (2006.01)

(52) U.S. Cl.
CPC .......... *H01Q 1/005* (2013.01); *H01Q 1/1257* (2013.01); *H01Q 3/005* (2013.01); *H01Q 3/12* (2013.01); *H04B 17/21* (2015.01); *H04B 17/318* (2015.01)

(58) Field of Classification Search
CPC ...... H01Q 1/005; H01Q 1/1257; H01Q 3/005; H01Q 3/12; H04B 17/21; H04B 17/318
See application file for complete search history.

(56) References Cited

U.S. PATENT DOCUMENTS

| | | | |
|---|---|---|---|
| 7,551,134 | B2 | 6/2009 | Dybdal et al. |
| 7,800,537 | B2 | 9/2010 | Dybdal et al. |
| 8,483,762 | B2 | 7/2013 | Steer et al. |
| 9,350,085 | B2 | 5/2016 | Ridel et al. |
| 9,698,883 | B2 | 7/2017 | Ponnuswamy |
| 9,966,650 | B2 | 5/2018 | Burdick et al. |
| 10,051,486 | B2 | 8/2018 | Vilhar |
| 10,056,675 | B1 | 8/2018 | Dybdal |
| 10,129,888 | B2 | 11/2018 | Negus et al. |

(Continued)

OTHER PUBLICATIONS

Hassan, Ahmad K. et al., "Automated Microwave Antenna Aligntment of Base Transceiver Station", Karlstad University, Dec. 12, 2011, 50 pages.

*Primary Examiner* — Nguyen T Vo
(74) *Attorney, Agent, or Firm* — Guntin & Gust, PLC; Matthew Tropper

(57) ABSTRACT

Aspects of the disclosure include commanding an antenna to a first orientation relative to a structure that the antenna is mounted to, obtaining at least one measurement from at least one sensor, wherein the at least one measurement represents a first magnitude and a first direction of a displacement of the antenna relative to the first orientation, determining that the displacement of the antenna relative to the first orientation exceeds a threshold in terms of the first magnitude, the first direction, or a combination thereof, responsive to the determining that the displacement of the antenna relative to the first orientation exceeds the threshold, identifying at least one piezoelectric device to engage to cause the antenna to assume a second orientation relative to the structure, and responsive to the identifying, commanding the at least one piezoelectric device to engage to cause the antenna to assume the second orientation.

20 Claims, 12 Drawing Sheets

(56) References Cited

U.S. PATENT DOCUMENTS

| | | | |
|---|---|---|---|
| 2007/0063911 A1* | 3/2007 | Davidson | H01Q 1/246 |
| | | | 343/810 |
| 2009/0033576 A1* | 2/2009 | Smoyer | H01Q 1/125 |
| | | | 343/761 |
| 2011/0109501 A1 | 5/2011 | Corman et al. | |
| 2013/0201855 A1 | 8/2013 | Luo et al. | |
| 2015/0263408 A1* | 9/2015 | Hirabe | H01Q 1/1228 |
| | | | 343/894 |
| 2016/0240910 A1 | 8/2016 | Balter et al. | |
| 2017/0118629 A1* | 4/2017 | Syed | H04W 8/22 |
| 2017/0311307 A1 | 10/2017 | Negus et al. | |
| 2018/0062246 A1* | 3/2018 | Hershey | H01Q 1/1242 |
| 2019/0013566 A1* | 1/2019 | Merrell | H01Q 1/42 |
| 2019/0131703 A1* | 5/2019 | Meyer | H01Q 1/005 |

\* cited by examiner

DYNAMIC AUTONOMOUS PIEZOELECTRIC STABILIZER MOUNT

FIELD OF THE DISCLOSURE

The subject disclosure relates to a dynamic autonomous piezoelectric stabilizer mount.

BACKGROUND

As the world becomes increasingly connected in terms of communications, network operators and service providers continue to seek out additional resources to facilitate such communications. For example, additional frequency bands are being allocated for use as part of various communication systems and applications. In wireless applications, as operating frequencies increase, an associated radiating beam decreases in terms of beam width. Accordingly, obtaining a proper alignment of an antenna relative to such beams becomes increasingly critical to the performance of wireless devices. Due at least in part to the inherit vulnerability of such antenna alignment to environmental conditions (e.g., wind), such high frequencies/frequency bands are typically limited to building-mounted applications. Further, systems are deployed with the knowledge that they may become inoperable during, e.g., moderate to high wind conditions, thereby representing a penalty in terms of reliability and performance.

BRIEF DESCRIPTION OF THE DRAWINGS

Reference will now be made to the accompanying drawings, which are not necessarily drawn to scale, and wherein:

FIGS. 2E-1 and 2E-2 depict illustrative embodiments of sub-methods that may be implemented/executed in accordance with the method of FIG. 2E.

DETAILED DESCRIPTION

Figure 1:
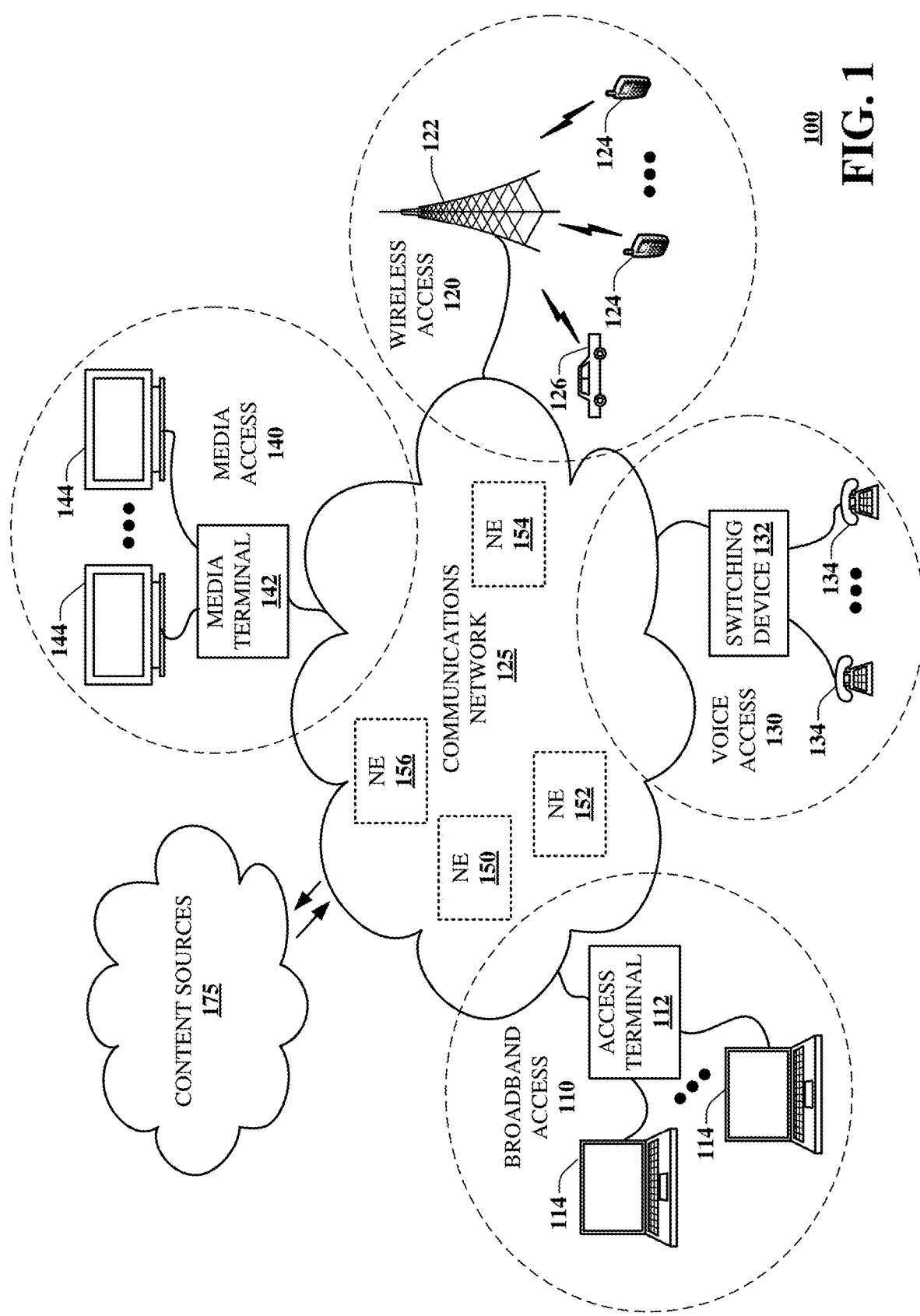
FIG. 1 is a block diagram illustrating an exemplary, non-limiting embodiment of a communications network in accordance with various aspects described herein.

The subject disclosure describes, among other things, illustrative embodiments for aligning an antenna relative to a structure that the antenna is mounted to. Other embodiments are described in the subject disclosure.

One or more aspects of the subject disclosure include measuring at least one parameter of a communication link for a plurality of orientations of an antenna relative to a mounting structure that the antenna is mounted to, determining a preferred orientation included in the plurality of orientations based on the measuring of the at least one parameter, storing a first plurality of values obtained from a plurality of sensors responsive to the determining of the preferred orientation, wherein the first plurality of values correspond to the preferred orientation, subsequent to the storing of the first plurality of values, obtaining a second plurality of values from the plurality of sensors, wherein the second plurality of values represents a displacement of the antenna or the mounting structure relative to the preferred orientation, responsive to the obtaining of the second plurality of values, determining that the displacement of the antenna or the mounting structure relative to the preferred orientation is greater than a threshold, and responsive to the determining that the displacement of the antenna or the mounting structure relative to the preferred orientation is greater than the threshold, commanding at least one actuator of a plurality of actuators to engage in order to modify an orientation of the antenna relative to the mounting structure from a first orientation to a second orientation.

One or more aspects of the subject disclosure include determining a preferred orientation for an antenna relative to a structure that the antenna is mounted to, wherein the determining of the preferred orientation is based on determining a maximum measurement included in a plurality of measurements, and wherein each of the plurality of measurements comprises a measurement of a signal strength of a signal received by the antenna, storing a first plurality of values corresponding to the preferred orientation, wherein the first plurality of values are obtained from a plurality of sensors, commanding the antenna to assume a first orientation subsequent to the storing of the first plurality of values, obtaining a second plurality of values from the plurality of sensors subsequent to the commanding of the antenna to assume the first orientation, wherein the second plurality of values represents a first displacement of the antenna or the structure relative to the preferred orientation, responsive to the obtaining of the second plurality of values, determining whether the second plurality of values deviates from the first plurality of values in an amount that is greater than a threshold, responsive to the determining of whether the second plurality of values deviates from the first plurality of values in the amount that is greater than the threshold indicating that the second plurality of values does not deviate from the first plurality of values in the amount that is greater than the threshold, obtaining a third plurality of values from the plurality of sensors, wherein the third plurality of values represents a second displacement of the antenna or the structure relative to the preferred orientation, and responsive to the determining of whether the second plurality of values deviates from the first plurality of values in the amount that is greater than the threshold indicating that the second plurality of values deviates from the first plurality of values in the amount that is greater than the threshold, causing at least one actuator of a plurality of actuators to engage in order to cause the antenna to assume a second orientation.

One or more aspects of the subject disclosure include commanding an antenna to a first orientation relative to a structure that the antenna is mounted to, obtaining at least one measurement from at least one sensor, wherein the at least one measurement represents a first magnitude and a first direction of a displacement of the antenna relative to the first orientation, determining that the displacement of the antenna relative to the first orientation exceeds a threshold in terms of the first magnitude, the first direction, or a combination thereof, responsive to the determining that the displacement of the antenna relative to the first orientation exceeds the threshold, identifying at least one piezoelectric device to engage to cause the antenna to assume a second orientation relative to the structure, and responsive to the identifying, commanding the at least one piezoelectric device to engage to cause the antenna to assume the second orientation.

Referring now to FIG. 1, a block diagram is shown illustrating an example, non-limiting embodiment of a communications network 100 in accordance with various aspects described herein. For example, communications network 100 can facilitate in whole or in part measuring at least one parameter of a communication link for a plurality of orientations of an antenna relative to a mounting structure that the antenna is mounted to, determining a preferred orientation included in the plurality of orientations based on the measuring of the at least one parameter, storing a first plurality of values obtained from a plurality of sensors responsive to the determining of the preferred orientation, wherein the first plurality of values correspond to the preferred orientation, subsequent to the storing of the first plurality of values, obtaining a second plurality of values from the plurality of sensors, wherein the second plurality of values represents a displacement of the antenna or the mounting structure relative to the preferred orientation, responsive to the obtaining of the second plurality of values, determining that the displacement of the antenna or the mounting structure relative to the preferred orientation is greater than a threshold, and responsive to the determining that the displacement of the antenna or the mounting structure relative to the preferred orientation is greater than the threshold, commanding at least one actuator of a plurality of actuators to engage in order to modify an orientation of the antenna relative to the mounting structure from a first orientation to a second orientation. Communications network 100 can facilitate in whole or in part determining a preferred orientation for an antenna relative to a structure that the antenna is mounted to, wherein the determining of the preferred orientation is based on determining a maximum measurement included in a plurality of measurements, and wherein each of the plurality of measurements comprises a measurement of a signal strength of a signal received by the antenna, storing a first plurality of values corresponding to the preferred orientation, wherein the first plurality of values are obtained from a plurality of sensors, commanding the antenna to assume a first orientation subsequent to the storing of the first plurality of values, obtaining a second plurality of values from the plurality of sensors subsequent to the commanding of the antenna to assume the first orientation, wherein the second plurality of values represents a first displacement of the antenna or the structure relative to the preferred orientation, responsive to the obtaining of the second plurality of values, determining whether the second plurality of values deviates from the first plurality of values in an amount that is greater than a threshold, responsive to the determining of whether the second plurality of values deviates from the first plurality of values in the amount that is greater than the threshold indicating that the second plurality of values does not deviate from the first plurality of values in the amount that is greater than the threshold, obtaining a third plurality of values from the plurality of sensors, wherein the third plurality of values represents a second displacement of the antenna or the structure relative to the preferred orientation, and responsive to the determining of whether the second plurality of values deviates from the first plurality of values in the amount that is greater than the threshold indicating that the second plurality of values deviates from the first plurality of values in the amount that is greater than the threshold, causing at least one actuator of a plurality of actuators to engage in order to cause the antenna to assume a second orientation. Communications network 100 can facilitate in whole or in part commanding an antenna to a first orientation relative to a structure that the antenna is mounted to, obtaining at least one measurement from at least one sensor, wherein the at least one measurement represents a first magnitude and a first direction of a displacement of the antenna relative to the first orientation, determining that the displacement of the antenna relative to the first orientation exceeds a threshold in terms of the first magnitude, the first direction, or a combination thereof, responsive to the determining that the displacement of the antenna relative to the first orientation exceeds the threshold, identifying at least one piezoelectric device to engage to cause the antenna to assume a second orientation relative to the structure, and responsive to the identifying, commanding the at least one piezoelectric device to engage to cause the antenna to assume the second orientation.

As shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
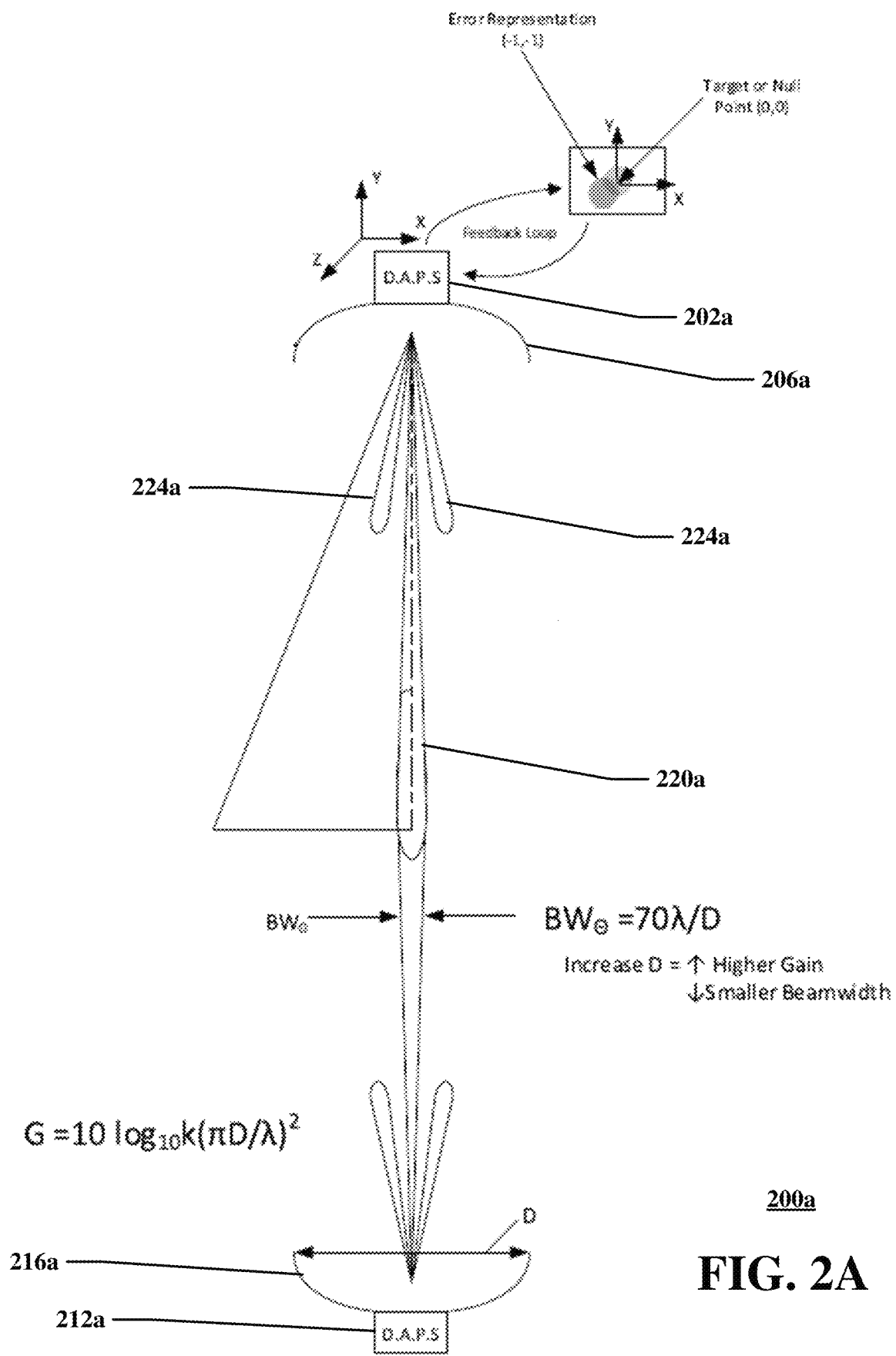
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or overlaid upon, the communication network 100 of FIG. 1 in accordance with various aspects described herein. The system 200a may facilitate communications between two or more communication sub-systems, devices, components, etc. In the illustrative embodiment represented by FIG. 2A, the system 200a is shown as accommodating communications in a point-to-point manner/fashion as described further below. Aspects of the disclosure encompass one-to-many types of communications, whereby a transmission from a given source is received by multiple targets or receivers.

The system 200a may include a first dynamic autonomous piezoelectric stabilizer (DAPS) unit 202a, a first antenna 206a, a second DAPS unit 212a, and a second antenna 216a. The first antenna 206a may be integrated with the first DAPS unit 202a and/or operatively coupled to the first DAPS unit 202a. The second antenna 216a may be integrated with the second DAPS unit 212a and/or operatively coupled to the second DAPS unit 212a.

In some embodiments, the system 200a may facilitate unidirectional communications (e.g., communications from the first antenna 206a to the second antenna 216a) and/or bidirectional communications (e.g., communications to and from/between each of the first antenna 206a and the second antenna 216a). Such communications may include wired/wireline communications and/or wireless communications in various embodiments.

In some embodiments, a transmission may include a main/primary lobe/beam 220a and/or one or more secondary lobes/beams 224a. In some instances, the main beam 220a may be representative of a primary frequency or wavelength and the secondary beam(s) 224a may be representative of harmonics (e.g., higher-order harmonics) that may be generated on the basis the primary frequency or wavelength. In some instances, the secondary beams 224a may be representative of transmissions at different (e.g., later) points in time relative to the main beam 220a.

An operator or provider of the system 200a may attempt to increase (e.g., maximize) the efficiency of the system 200a by increasing the performance and capacity of the system 200a. For example, the performance and the capacity of the system 200a may be enhanced by increasing the gain (G) of the system 200a. The gain G of the system 200a may be increased by increasing antenna diameter (D) and decreasing wavelength ($\lambda$) (or, analogously, increasing the operating frequency). For example, the gain G may be determined as follows:

$$G = 10\ \log_{10} k(D/\lambda)^2,$$

where 'k' is a parameter that may be determined via analysis and/or testing.

However, the antenna diameter D may be inversely proportional to antenna beam width (BW$\theta$) (illustratively shown for the main beam 220a in FIG. 2A). For example, and as represented in FIG. 2A, the antenna beam width BW$\theta$ of the main beam 220a may be determined as follows:

$$BW\theta = 70\lambda/D$$

Accordingly, all other conditions being equal, increasing the antenna diameter D may increase the gain G but decrease the beam width BW$\theta$. As the beam width BW$\theta$ continues to decrease (in the interest of increasing the gain G), it may become increasingly difficult (if not impossible) to properly align, e.g., the first antenna 206a and/or the second antenna 216a in accordance with an antenna alignment procedure. If one or more of the antennas 206a and 216a are not properly aligned, that may compromise the performance or reliability of the system 200a. For example, a lack of antenna alignment could lead to an increase in communication failures, buffering delays, an increase in overhead (e.g., non-payload) traffic in a network, etc.

Furthermore, even assuming that an antenna can be aligned in the first instance, various conditions or events may cause the antenna to deviate from alignment. For example, and referring to FIG. 2C, a system 200c is shown wherein an antenna 206c (which may correspond to the antenna 206a or the antenna 216a of FIG. 2A) is out-of-alignment/misaligned relative to a structure 232c (e.g., a monopole, a tower, etc.) that the antenna 206c is mounted to. The misalignment may be caused by movement/displacement of the structure 232c relative to the antenna 206c. To demonstrate, an applied force due to wind may cause a displacement of the structure 232c relative to the antenna 206c as shown in FIG. 2C.

In view of the foregoing, and as described in further detail below, aspects of the disclosure are directed to obtaining/establishing and maintaining a given antenna alignment/orientation over an associated operational envelope/profile. To demonstrate, in the event that the antenna 206c becomes misaligned relative to, e.g., the structure 232c as shown in FIG. 2C, aspects of the disclosure may re-align the antenna 206c relative to the structure 232c as shown in connection with the system 200d of FIG. 2D.

Referring to FIGS. 2A-2D (specifically, FIGS. 2A-2B) a Cartesian coordinate system is superimposed for reference purposes. For example, as shown in FIGS. 2A, X, Y, and Z axes of a Cartesian coordinate/reference system are superimposed. A given antenna's position/orientation (on an absolute or relative basis) may be represented by a coordinate triple, where each value of the triple corresponds to a respective value taken along one of the axes X, Y, and Z. While a Cartesian coordinate system is shown, one skilled in the art will appreciate that aspects of the disclosure may be implemented or practiced using other coordinate systems. For example, aspects of the disclosure may be implemented or practiced in accordance with a polar coordinate system in some embodiments.

Figure 2B:
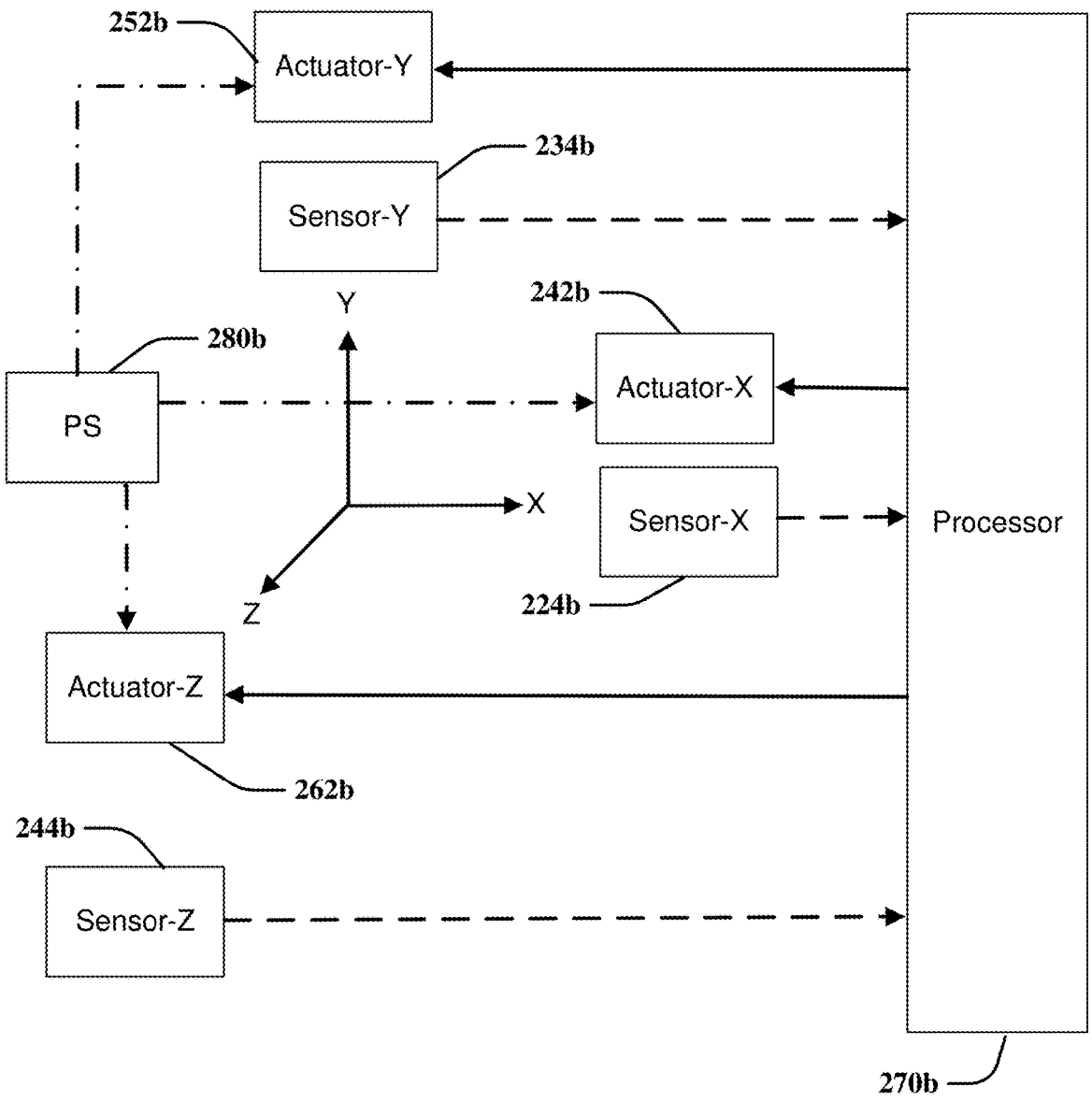
FIG. 2B is a block diagram illustrating an example, non-limiting embodiment of a system incorporated as part of a DAPS unit in accordance with various aspects described herein.
Figure 2C:
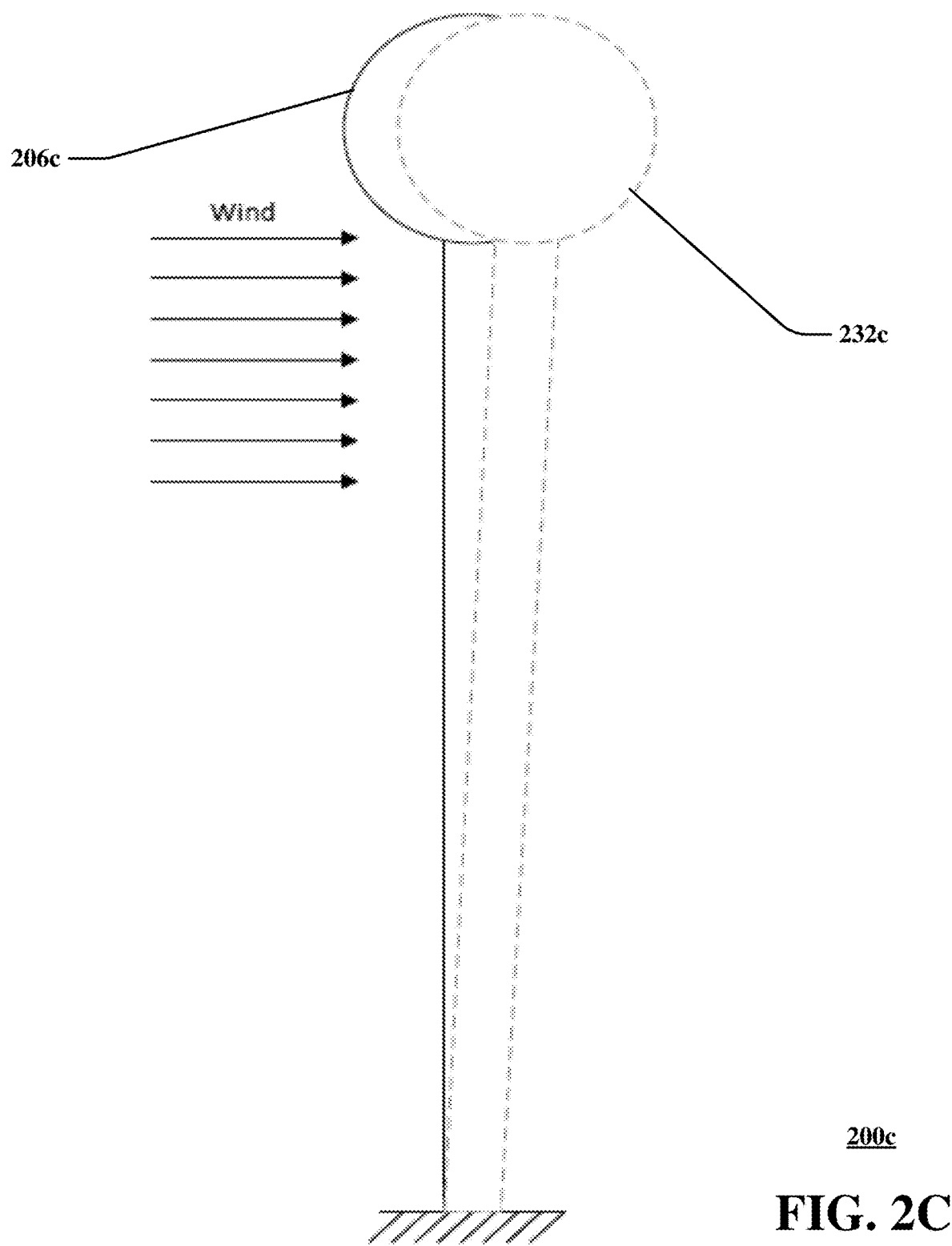
FIG. 2C depicts a system wherein an antenna is displaced relative to a mounting structure in accordance with various aspects described herein.
Figure 2D:
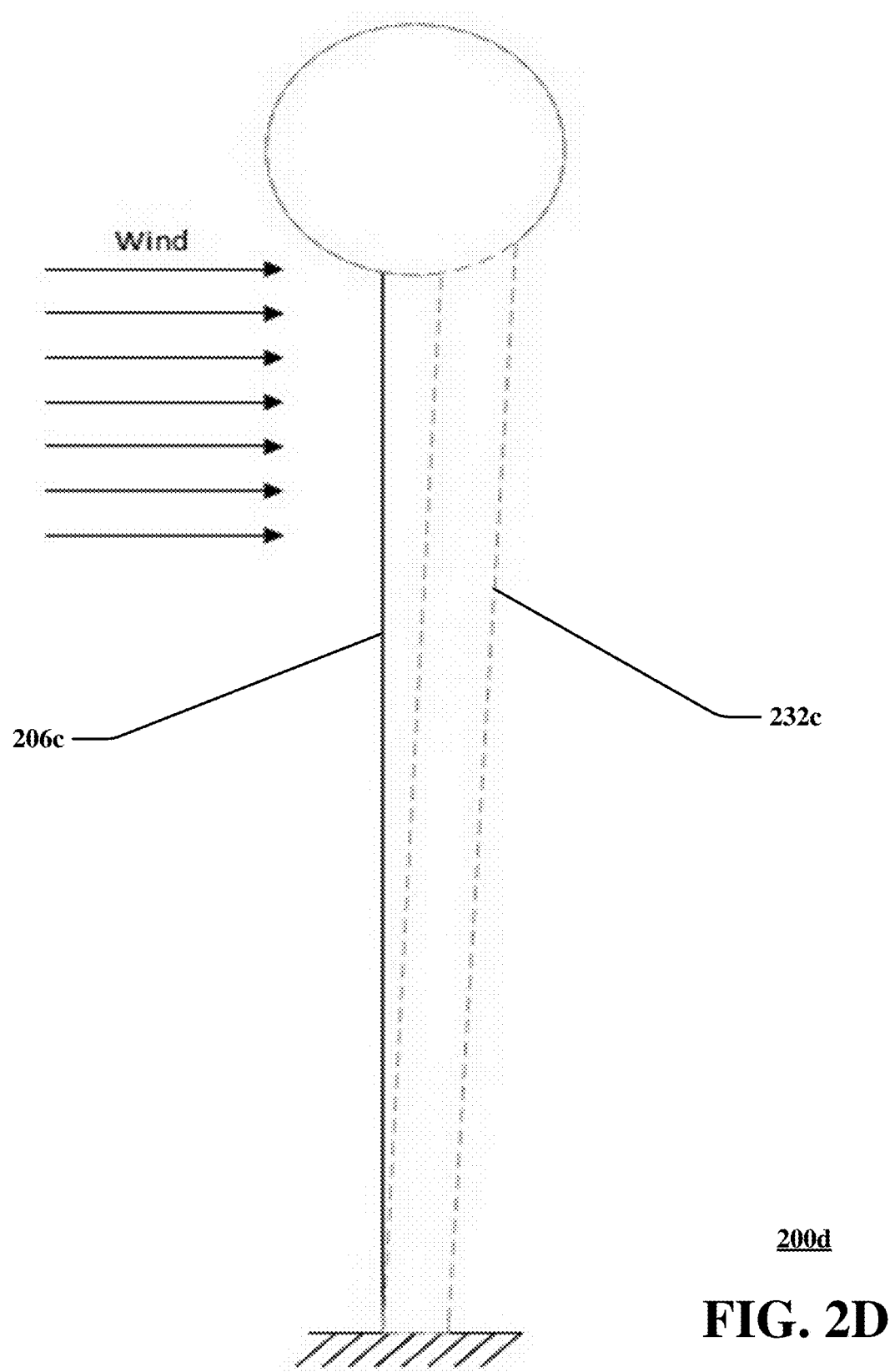
FIG. 2D depicts the system of FIG. 2C, wherein a position of the antenna is restored following the displacement shown in FIG. 2C.
Figure 2E:
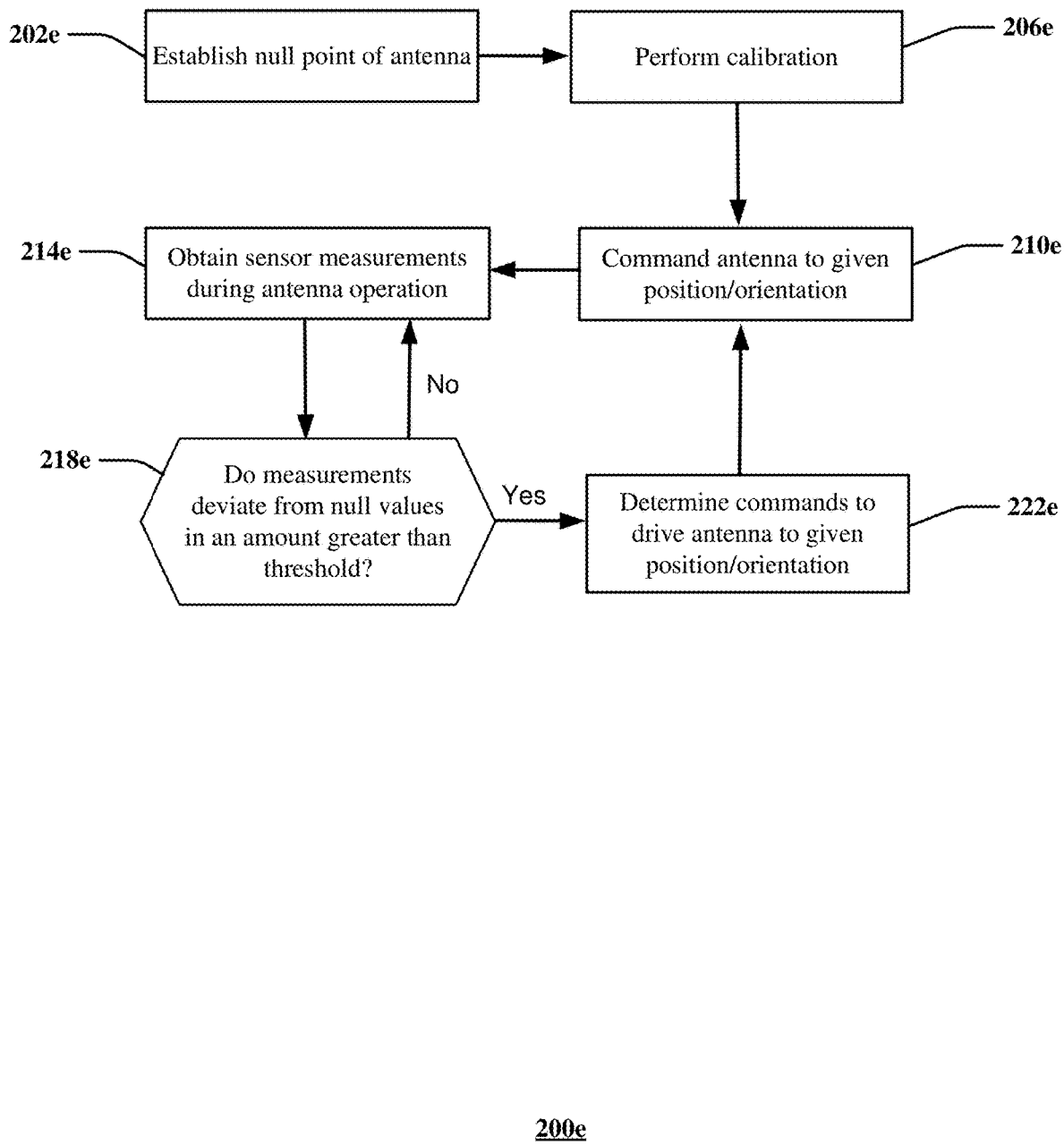
FIG. 2E depicts an illustrative embodiment of a method in accordance with various aspects described herein.
Figures 1, 2E:
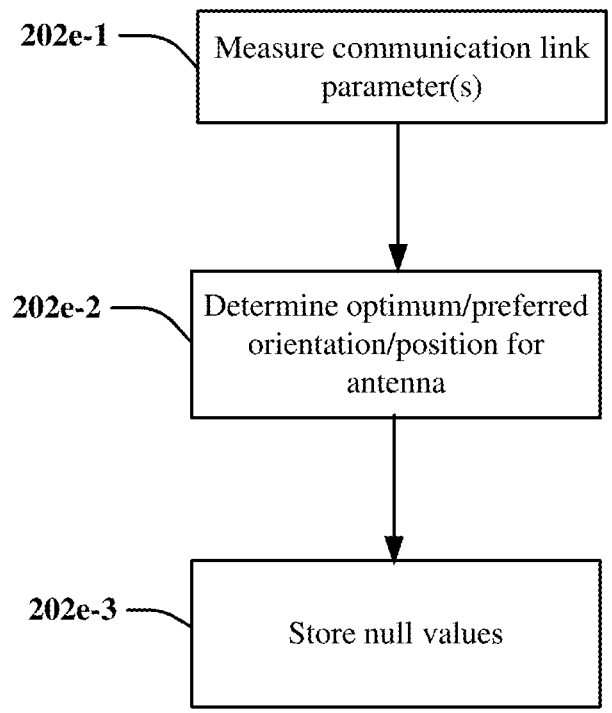
Figures 2, 2E:
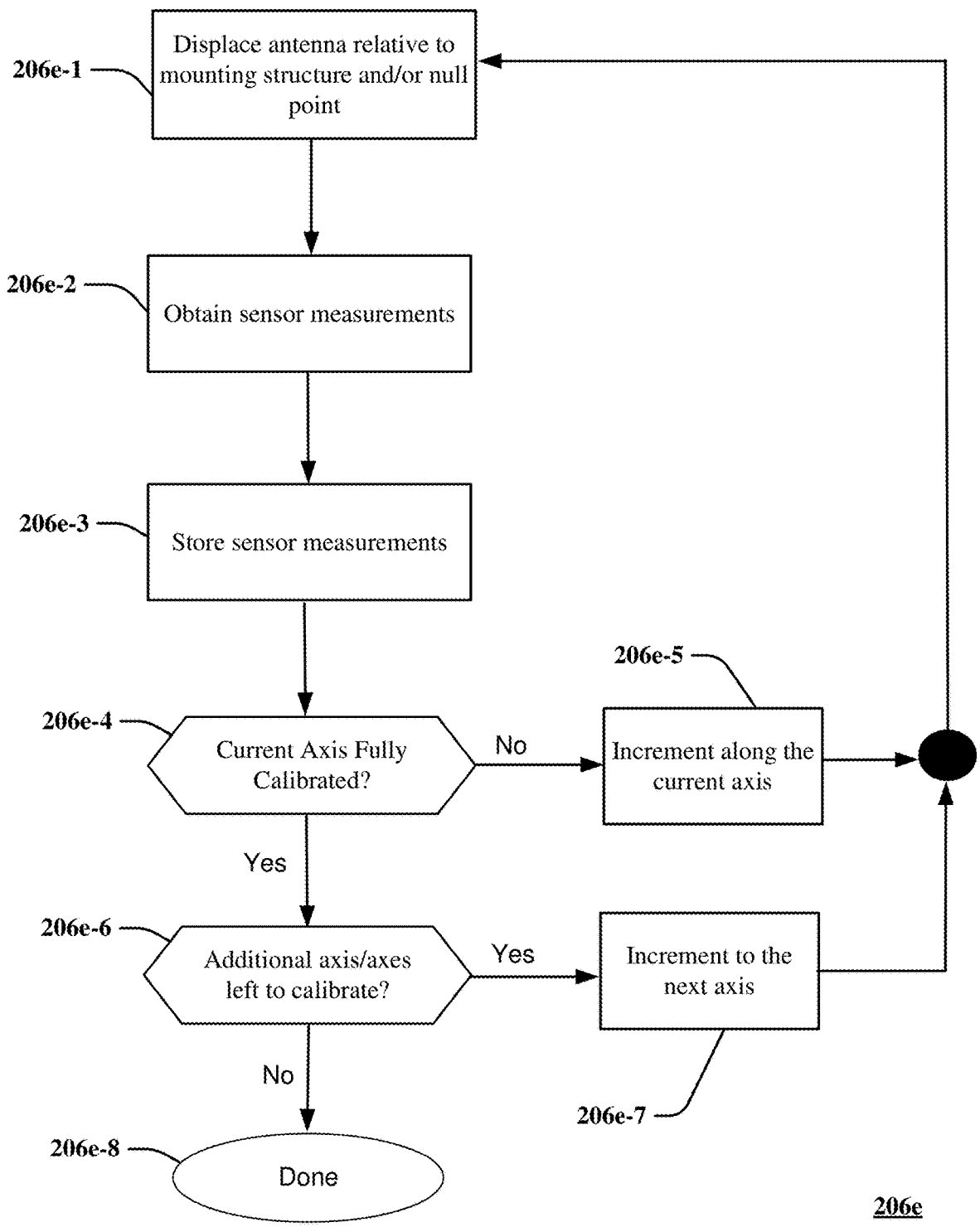

Referring now to FIG. 2E, an illustrative embodiment of a method 200e in accordance with various aspects described herein is shown. The method 200e is described below in connection with the systems 200a-200d of FIGS. 2A-2D. In particular, aspects of the method 200e are described below in conjunction with establishing and/or maintaining an alignment of the antenna 206a of FIG. 2A. One skilled in the art will appreciate, based on a full review of this disclosure, that aspects of the method 200e may be practiced or implemented in accordance with other systems, devices or components. Reference may also be had to FIG. 2E-1 through FIG. 2E-2, which correspond to sub-methods that may be implemented/practiced in conjunction with the method 200e of FIG. 2E. In some embodiments, aspects of the methods of FIG. 2E-1 through FIG. 2E-2 may be practiced/implemented independent of the method 200e specifically shown in FIG. 2E.

In block 202e, a preferred orientation/position of the antenna 206a may be established/determined. For example, the preferred orientation/position of the antenna 206a may be determined in accordance with a peaking procedure/algorithm. During the peaking procedure, a measurement may be performed of one or more parameters of a communication channel/link (see block 202e-1 of FIG. 2E-1). For example, a signal received by the antenna 206a may be measured using a radio frequency (RF) sensor, a voltmeter, etc. The signal may correspond to a pilot/test signal emitted by, e.g., the antenna 216a. The signal may be measured/analyzed in accordance with one or more metrics, such as for example received signal strength.

Based on the measured parameters, an optimum orientation/position for the antenna 206a may be determined and selected as part of block 202e (see block 202e-2 of FIG. 2E-1). For example, the optimum orientation/position for the antenna 206a may be determined and selected in order to, e.g., increase (e.g., maximize) the received signal strength, mitigate (e.g., reduce or even eliminate) the impact of observed/detected interference, increase (e.g., maximize) throughput, etc.

The orientation/position determined/selected as part of block 202e may be referred to as a null point for the antenna 206a for reasons that will become clearer below. In this respect, and briefly referring to the system 200b of FIG. 2B (where the system 200b may correspond to, or be included as a part of, a DAPS unit (e.g., the DAPS unit 202a of FIG. 2A)), values (e.g., voltages) measured/generated by sensors 224b, 234b, and 244b when the antenna 206a is at the null point may be treated as null/reference values. These null values may be saved/stored by a processor 270b (or a storage or memory device associated therewith) (see block 202e-3 of FIG. 2E-1). In some embodiments, each of the sensors 224b, 234b, and 244b may include an accelerometer and/or a gyroscope to facilitate the generation of the values described above.

Referring back to FIG. 2E, in block 206e a calibration may be performed. The calibration of block 206e may entail displacing the antenna 206a relative to, e.g., a structure (e.g., structure 232c of FIGS. 2C-2D) that the antenna 206a is mounted to and/or relative to the null point of block 202e (see block 206e-1 of FIG. 2E-2).

The displacement of block 206e (e.g., of block 206e-1 of FIG. 2E-2) may be facilitated via an actuation of one or more actuators, such as for example the actuators 242b, 252b, and 262b of the system 200b (see FIG. 2B). The actuators 242b, 252b, and 262b may include one or more motors or piezoelectric devices. The actuators 242b, 252b, and 262b may respond to (e.g., may be activated/engaged based on) one or more signals/commands generated by the processor 270b.

As shown in FIG. 2B, each of the actuators 242b, 252b, and 262b may be paired with a respective one of the sensors 224b, 234b, and 244b. Still further, each pair of actuator-and-sensor may be oriented/aligned along one of the X, Y, and Z axes. For example, and referring to FIGS. 2A-2B, the actuator 242b and the sensor 224b may be oriented/aligned along the X-axis, the actuator 252b and the sensor 234b may be oriented/aligned along the Y-axis, and the actuator 262b and the sensor 244b may be oriented/aligned along the Z-axis. As described further below, based on the pairings and alignments of the actuators and sensors, the calibration of block 206e may be performed over some or all of the three-dimensional space/envelope of the antenna 206a by providing appropriate signals/commands to the actuators 242b, 252b, and 262b.

Following the actuation of an actuator 242b, 252b, or 262b as part of block 206e (see also block 206e-1 of FIG. 2E-2), measurements/values reported/provided/generated by the sensors 224b, 234b, and 244b may be obtained by the processor 270b in block 206e (see also block 206e-2 of FIG. 2E-2). These measurements/values may be saved/stored by the processor 270b (or the storage/memory device associated therewith) as part of block 206e (see also block 206e-3 of FIG. 2E-2).

As described above, the calibration of block 206e may be executed over some or all of the three-dimensional space. For example, following the execution of block 206e-3 of FIG. 2E-2, a determination may be made whether a current axis has been fully calibrated in block 206e-4. Full calibration in this context may refer to calibration over an entire range when considering operational or physical limitations that may be present in the system (e.g., the system 200a of FIG. 2A) being calibrated. For example, a range of commands/signals provided by the processor 270b to the actuators 242b, 252b, or 262b may be based on a specification/capability associated with the actuators 242b, 252b, or 262b, one or more quality of service (QoS) parameters associated with communications in the system, etc.

If a full calibration has not been performed along a current axis (e.g., the "no" path is taken out of block 206e-4 of FIG. 2E-2), flow may proceed from block 206e-4 to block 206e-5. Otherwise (e.g., the "yes" path is taken out of block 206e-4 of FIG. 2E-2), flow may proceed from block 206e-4 to block 206e-6.

In block 206e-5, the command(s) sent by the processor 270b to the actuators 242b, 252b, and 262b may serve to increment the position of the antenna 206a along the current axis, which is to say that the command(s) sent by the processor 270b to the actuators 242b, 252b, and 262b may serve to keep two out of the three actuators at the same orientation/position. One skilled in the art will appreciate, based on a review of this disclosure, that the flow from block 206e-4 to block 206e-5, and from block 206e-5 to block 206e-1, may serve as a full/complete sweep of the current axis (subject to any of the limitations/constraints as set forth above).

In block 206e-6, a determination may be made whether there is/are any additional axes left to calibrate over. If so, (e.g., the "yes" path is taken from block 206e-6 of FIG. 2E-2), flow may proceed from block 206e-6 to block 206e-7. Otherwise (e.g., the "no" path is taken from block 206e-6 of FIG. 2E-2), flow may proceed to block 206e-8 wherein the operations of block 206e may terminate.

In block 206e-7, the current axis that is being calibrated may be modified (e.g., incremented) to correspond to the next axis to be calibrated. From block 206e-7, flow may proceed to block 206e-1, where the displacement may be based on the modification of block 206e-7.

One skilled in the art will appreciate, based on a review of this disclosure, that block 206e-4 through block 206e-7 facilitates a mapping/characterization of some or all of the entire range of positions/orientations of the antenna 206a. In this respect, block 206e may be used to account for device or component variances/variability that may be present in the system 200a or the system 200b. Depending on the application at hand, the increment of block 206e-5 may be selected to be as large or as small as needed. For example, a smaller increment/step size as part of block 206e-5 may enhance the accuracy of the calibration obtained as part of block 206e, but may be accompanied by the added expense/penalty of an increase in the amount of time to complete the calibration (all other conditions being equal). Conversely, a larger increment/step size as part of block 206e-5 may decrease the accuracy of the calibration as part of block 206e, but may be accompanied by a decrease in terms of the amount of time needed to complete the calibration (all other conditions being equal). Thus, a tradeoff may be made between the accuracy/thoroughness of the calibration of block 206e on the one hand and the computing time/resources needed to complete the calibration of block 206e on the other hand.

Referring back specifically to FIG. 2E, once the calibration of block 206e is complete, flow may proceed from block 206e to block 210e. In block 210e, the antenna 206a may be commanded to a given position (via one or more of the actuators 242b, 252b, or 262b of FIG. 2B), such as the null point established in block 202e. From block 210e, flow may proceed to block 214e.

In block 214e, measurements/values may be obtained during the operation of the antenna 206a (see FIG. 2A). For example, the measurements/values of block 214e may be obtained by the processor 270b from the sensors 224b, 234b, and 244b (see FIG. 2B). In some embodiments, the measurements/values of block 214e may be based on one or more signals (e.g., one or more pilot/test signals) emitted/transmitted by, e.g., the antenna 216a (see FIG. 2A).

In block 218e, a determination may be made whether the measurements/values of block 214e deviate from the null values obtained as part of block 202e (see also block 202e-3 of FIG. 2E-1) in an amount that is greater than a threshold. The threshold may be based on one or more factors/considerations, such as for example a level/capacity of a power supply (PS) 280b that is available to the actuators 242b, 252b, and 262b, network loads/traffic, QoS parameters/specifications (e.g., a QOS parameter associate with a communication device that is engaged in a communication session via the antenna 206a), etc.

If it is determined in block 218e that the measurements/values of block 214e do not deviate from the null values in an amount that is greater than the threshold (e.g., the "no" path is taken from block 218e), flow may proceed from block 218e to block 214e. In this respect, a loop may be established between block 214e and block 218e to continue monitoring the measurements/values of block 214e for compliance within the threshold.

When the determination of block 218e indicates that the measurements/values of block 214e deviate from the null values in an amount that is greater than the threshold (e.g., the "yes" path is taken from block 218e), flow may proceed from block 218e to block 222e. The flow from block 218e to block 222e may be caused by one or more events or conditions, such as for example the wind causing a displacement of the mounting structure relative to the antenna as described above in conjunction with FIG. 2C.

In block 222e, a determination and selection may be made regarding commands/signals to issue from the processor 270b to the actuators 242b, 252b, and 262b. The commands/signals of block 222e may be selected to cause the antenna to re-align with the mounting structure (e.g., may cause the antenna to re-obtain the null point) or come within a threshold amount of re-alignment (e.g., may cause the antenna to come within a threshold amount of the null point). The commands/signals of block 222e may be selected in accordance with the stored sensor measurements of the calibration performed/obtained in block 206e (see also block 206e-3 of FIG. 2E-2). For example, to the extent that the step size/increment of block 206e-5 of FIG. 2E-2 is substantially small, the determination/selection of block 222e may substantially correspond to a task of a looking-up values in a look-up table to determine/identify an existence of a match between the measurements/values of block 214e and a value obtained as part of block 206e-3. To the extent that an exact match does not exist, interpolation (or other technique) may be applied between the measurements of block 214e and the two closest matches in conjunction with block 206e-3 of FIG. 2E-2.

From block 222e, flow may proceed to block 210e; e.g., in block 210e the antenna 206a (see FIG. 2A) may be commanded to the position/orientation established by the commands of block 222e. Thus, as shown by the flow from block 222e to block 210e in FIG. 2E, a loop may be established to ensure that the antenna 206a remains within a threshold amount of the null values; to the extent that there is deviation from the null values in an amount greater than the threshold, the actuators 242 may be commanded/engaged to reduce the deviation (in terms of magnitude and/or direction).

The reduction in the deviation from the null values may cause the antenna 206a to come within a threshold amount of the orientation/position of the null point (in terms of magnitude and/or direction). To the extent that there is a difference between the null point and the commanded position/orientation, such a difference may be based on one or more factors. For example, factors that may influence the commands may include a level/capacity of a power supply (PS) 280b that is available to the actuators 242b, 252b, and 262b, network loads/traffic, QoS parameters/specifications, etc. In some embodiments, one or more of the factors may be excluded from the determination/selection of one or more of the commands. For example, in some embodiments once the null point is established (see block 202e of FIG. 2E), parameters regarding communication signal quality may be ignored/excluded.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In connection with the description of the method 200e above, the antenna 206a of FIG. 2A was the primary subject of the method 200e (e.g., the calibration of block 206e: see FIG. 2E) on the basis of signals (e.g., pilot/test signals) emitted/transmitted by the antenna 216a. One skilled in the art will appreciate, based on a review of this disclosure, that the antenna 216a may also be subjected to aspects of the method 200e (e.g., the calibration of block 206e of FIG. 2E), potentially on the basis of signals emitted/transmitted by the antenna 206a. Still further, while the determination of the null point for the antenna 206a was described above in connection with block 202e as being based on, e.g., received signal strength, aspects of the disclosure may facilitate a determination and selection of the null point on the basis of both reception and transmission. For example, in some instances it might not be sufficient to only consider parameters related to reception by the antenna 206a. Additionally, or alternatively, parameters related to transmission by the antenna 206a and/or reception by the antenna 216a may need to be taken into account when determining/selecting the null point for the antenna 206a. In this regard, the antennas 206a and 216a may exchange one or more messages as part of the execution of the method 200e to determine/select a null point (as part of block 202e of FIG. 2E) that represents an optimum orientation/position for, e.g., the antenna 206a when considering the influence of the orientation/position of the antenna 206a on the antenna 216a's ability to receive signals from the antenna 206a.

Aspects of the disclosure provide an autonomous procedure/algorithm to align antenna beams (e.g., microwave antenna beams) utilizing, e.g., a DAPS unit during test and acceptance as well throughout the life cycle of a (microwave) radio hop to provide enhanced levels of reliability and performance. Aspects of the disclosure may assist in identifying and locating an antenna with respect to a null point. To the extent that a user (e.g., a technician) is involved in the procedure/algorithm, one or more input/output (I/O) interfaces may be utilized to provide the user with instructions and/or to provide feedback to the user during the procedure/algorithm as an aid.

Aspects of the disclosure may utilize/invoke a calibration procedure/algorithm to train a DAPS unit. For example, the calibration procedure may be used to mitigate (e.g., eliminate) the impact of device or component variation from a first instance of the DAPS unit relative to other instances of the DAPS unit. The calibration may be performed periodically to account for device or component drift over the operating lifetime of the DAPS unit. The calibration may be performed in response to one or more events, such as for example in response to a replacement of a component (e.g., an actuator, a sensor, etc.) of the DAPS unit.

The calibration procedure/algorithm may be performed over limits/constraints established by a network operator or service provider. For example, the calibration limits/constraints may be based on an error rate being below a specified threshold.

Aspects of the disclosure may utilize piezoelectric devices (or other actuators) to provide/obtain fine resolution in terms of antenna movements/displacements. For example, aspects of the disclosure may provide for nanoscale changes in antenna or mounting structure position/orientation. In this respect, aspects of the disclosure may be deployed/utilized in environments characterized by harsh conditions (e.g., variable winds, stringent requirements in terms of accuracy (e.g., narrow beam widths), etc.). Moreover, aspects of the disclosure may provide for execution of semi-automated and automated algorithms, thereby making these aspects particularly suitable for remote geographical locations (e.g., rural areas) characterized by limited user oversight/access.

Aspects of the disclosure may incorporate machine learning and artificial intelligence to determine/select a position/orientation for one or more antennas or antenna systems. For example, aspects of the disclosure may leverage information or data contained in one or more storage devices (e.g., memories, databases, etc.) to determine the likelihood/probability of a particular parameter (or set of parameters) occurring and/or the influence of the parameter(s) on antenna orientation/position. In this respect, in some embodiments actions/activities (e.g., a modifying of an antenna's positon/orientation) may be undertaken/executed in advance of futuristic events with a given degree/probability of occurrence. To demonstrate, a pattern of historical, weather-related events may be analyzed to determine the likelihood of a particular weather event occurring in the future. Steps/Actions may be taken to mitigate the impact of the particular weather event on the reliability/availability of an antenna or antenna system.

Aspects of the disclosure may be applied to one or more antennas that may be operative (e.g., may transmit and/or receive signals) in one or more frequency bands. For example, aspects of the disclosure may be applied in connection with an E band (e.g., 60 to 90 GHz), a V band (e.g., 40 to 75 GHZ), a W band (e.g., 75 to 100 GHz), an F band (e.g., 90 to 140 GHz), etc. Aspects of the disclosure may be applied in relation to free space optics/optical communications/communication systems.

Aspects of the disclosure may break away from a conventional, static relationship that exists between an antenna and a mounting structure. For example, as the mounting structure is displaced/moved, a DAPS unit (or other device or unit) may determine the extent/degree of displacement/movement (in terms of magnitude and direction) and may re-align the antenna relative to the mounting structure as warranted. Furthermore, aspects of the disclosure may be operative independent of any particular factor or set of factors, thereby providing flexibility in terms of utilization/allocation of such aspects. For example, aspects of the disclosure are sufficiently generic to enable application on various types/styles (e.g., make, model, serial number) of equipment.

Furthermore, aspects of the disclosure may facilitate a plug-and-play style of technology/capability, thereby enabling wide-scale use/deployment across various platforms and architectures.

Aspects of the disclosure may be utilized in one or more dimensions. For example, aspects of the disclosure may be employed to adapt an antenna's position/orientation in one or more dimensions (e.g., three dimensions).

Figure 3:
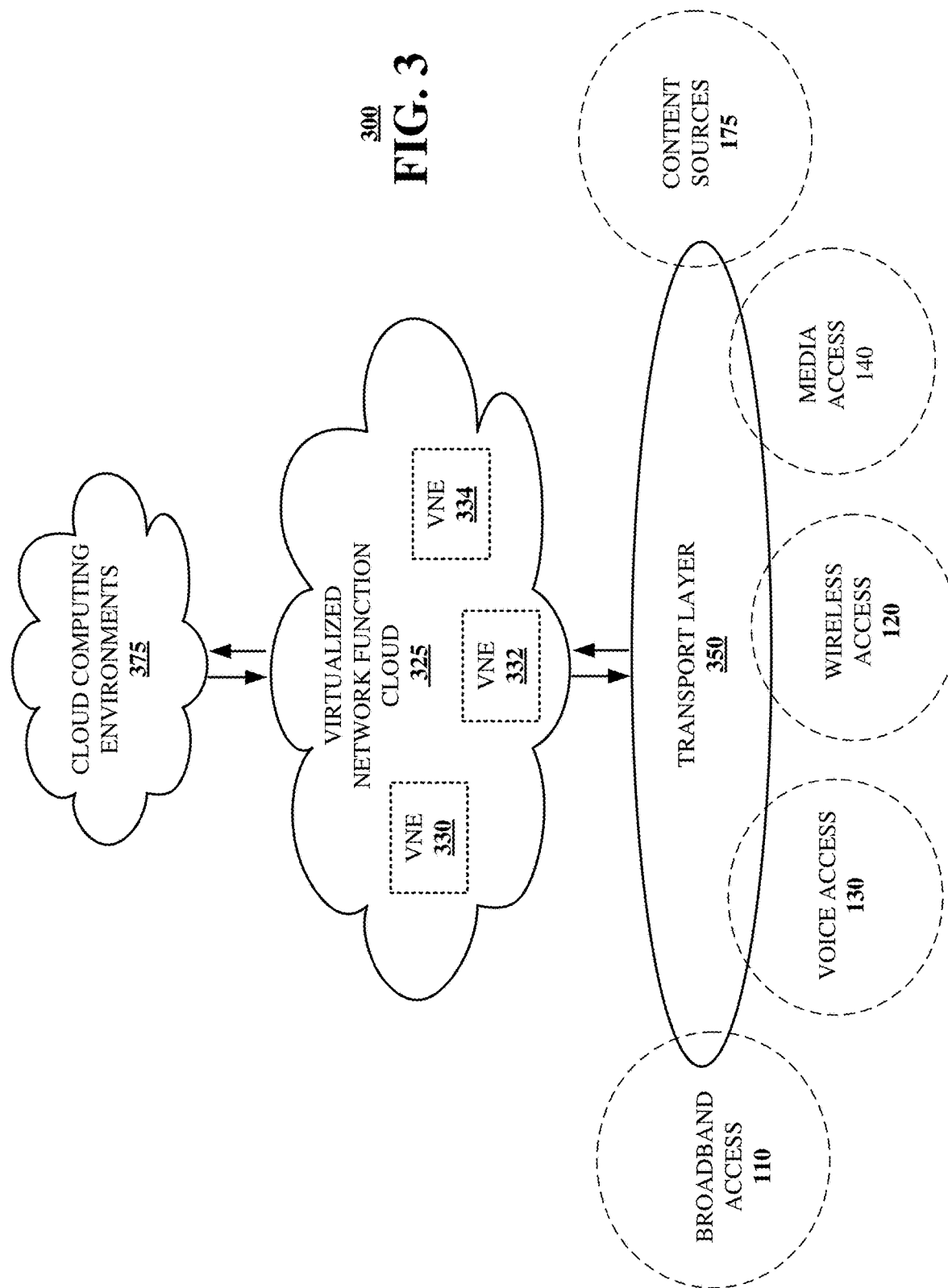
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200a-200d, and method 200e presented in FIGS. 1, 2A, 2B, 2C, 2D, and 2E. For example, virtualized communication network 300 can facilitate in whole or in part measuring at least one parameter of a communication link for a plurality of orientations of an antenna relative to a mounting structure that the antenna is mounted to, determining a preferred orientation included in the plurality of orientations based on the measuring of the at least one parameter, storing a first plurality of values obtained from a plurality of sensors responsive to the determining of the preferred orientation, wherein the first plurality of values correspond to the preferred orientation, subsequent to the storing of the first plurality of values, obtaining a second plurality of values from the plurality of sensors, wherein the second plurality of values represents a displacement of the antenna or the mounting structure relative to the preferred orientation, responsive to the obtaining of the second plurality of values, determining that the displacement of the antenna or the mounting structure relative to the preferred orientation is greater than a threshold, and responsive to the determining that the displacement of the antenna or the mounting structure relative to the preferred orientation is greater than the threshold, commanding at least one actuator of a plurality of actuators to engage in order to modify an orientation of the antenna relative to the mounting structure from a first orientation to a second orientation. Communication network 300 can facilitate in whole or in part determining a preferred orientation for an antenna relative to a structure that the antenna is mounted to, wherein the determining of the preferred orientation is based on determining a maximum measurement included in a plurality of measurements, and wherein each of the plurality of measurements comprises a measurement of a signal strength of a signal received by the antenna, storing a first plurality of values corresponding to the preferred orientation, wherein the first plurality of values are obtained from a plurality of sensors, commanding the antenna to assume a first orientation subsequent to the storing of the first plurality of values, obtaining a second plurality of values from the plurality of sensors subsequent to the commanding of the antenna to assume the first orientation, wherein the second plurality of values represents a first displacement of the antenna or the structure relative to the preferred orientation, responsive to the obtaining of the second plurality of values, determining whether the second plurality of values deviates from the first plurality of values in an amount that is greater than a threshold, responsive to the determining of whether the second plurality of values deviates from the first plurality of values in the amount that is greater than the threshold indicating that the second plurality of values does not deviate from the first plurality of values in the amount that is greater than the threshold, obtaining a third plurality of values from the plurality of sensors, wherein the third plurality of values represents a second displacement of the antenna or the structure relative to the preferred orientation, and responsive to the determining of whether the second plurality of values deviates from the first plurality of values in the amount that is greater than the threshold indicating that the second plurality of values deviates from the first plurality of values in the amount that is greater than the threshold, causing at least one actuator of a plurality of actuators to engage in order to cause the antenna to assume a second orientation. Communication network 300 can facilitate in whole or in part commanding an antenna to a first orientation relative to a structure that the antenna is mounted to, obtaining at least one measurement from at least one sensor, wherein the at least one measurement represents a first magnitude and a first direction of a displacement of the antenna relative to the first orientation, determining that the displacement of the antenna relative to the first orientation exceeds a threshold in terms of the first magnitude, the first direction, or a combination thereof, responsive to the determining that the displacement of the antenna relative to the first orientation exceeds the threshold, identifying at least one piezoelectric device to engage to cause the antenna to assume a second orientation relative to the structure, and responsive to the identifying, commanding the at least one piezoelectric device to engage to cause the antenna to assume the second orientation.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
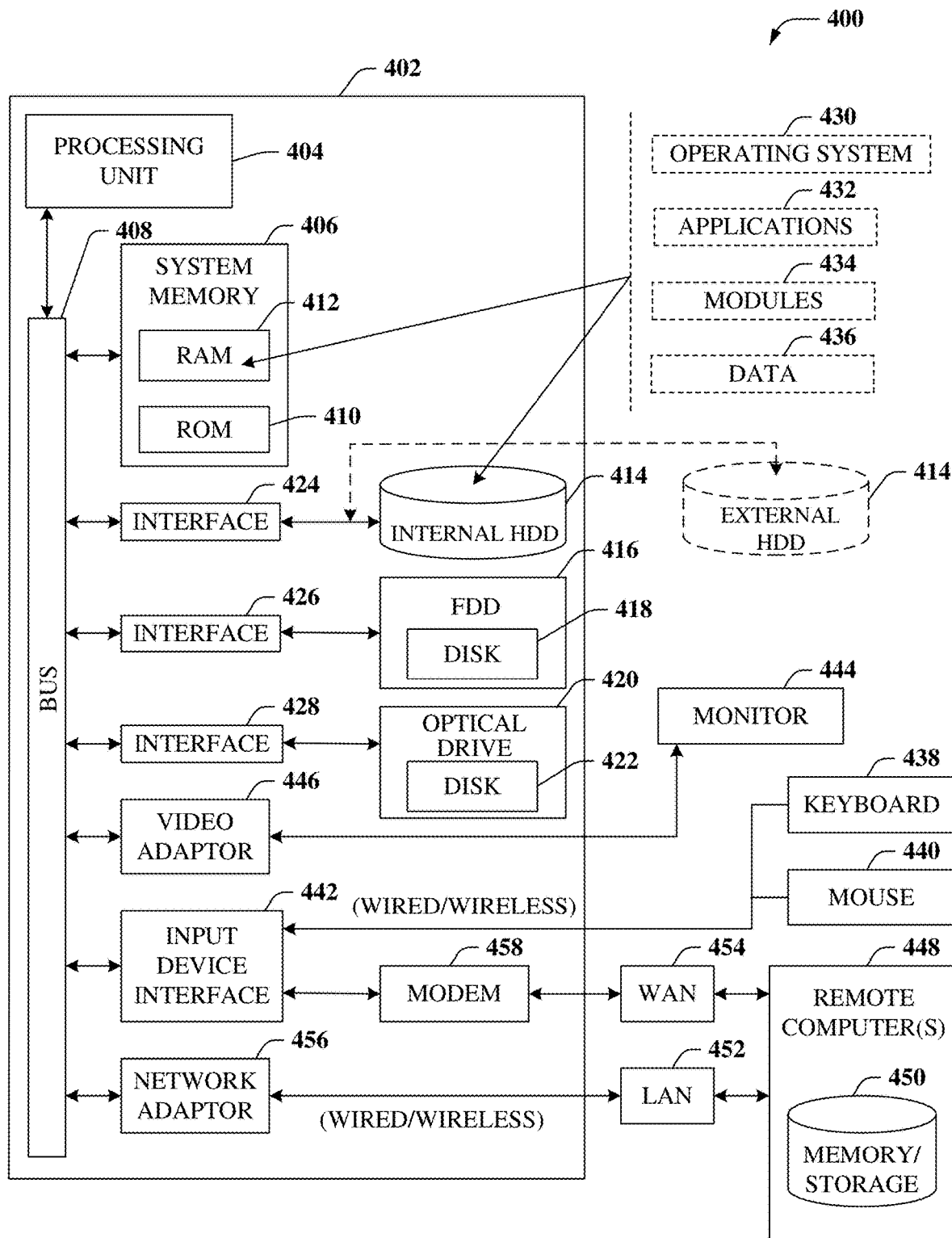
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part measuring at least one parameter of a communication link for a plurality of orientations of an antenna relative to a mounting structure that the antenna is mounted to, determining a preferred orientation included in the plurality of orientations based on the measuring of the at least one parameter, storing a first plurality of values obtained from a plurality of sensors responsive to the determining of the preferred orientation, wherein the first plurality of values correspond to the preferred orientation, subsequent to the storing of the first plurality of values, obtaining a second plurality of values from the plurality of sensors, wherein the second plurality of values represents a displacement of the antenna or the mounting structure relative to the preferred orientation, responsive to the obtaining of the second plurality of values, determining that the displacement of the antenna or the mounting structure relative to the preferred orientation is greater than a threshold, and responsive to the determining that the displacement of the antenna or the mounting structure relative to the preferred orientation is greater than the threshold, commanding at least one actuator of a plurality of actuators to engage in order to modify an orientation of the antenna relative to the mounting structure from a first orientation to a second orientation. Computing environment 400 can facilitate in whole or in part determining a preferred orientation for an antenna relative to a structure that the antenna is mounted to, wherein the determining of the preferred orientation is based on determining a maximum measurement included in a plurality of measurements, and wherein each of the plurality of measurements comprises a measurement of a signal strength of a signal received by the antenna, storing a first plurality of values corresponding to the preferred orientation, wherein the first plurality of values are obtained from a plurality of sensors, commanding the antenna to assume a first orientation subsequent to the storing of the first plurality of values, obtaining a second plurality of values from the plurality of sensors subsequent to the commanding of the antenna to assume the first orientation, wherein the second plurality of values represents a first displacement of the antenna or the structure relative to the preferred orientation, responsive to the obtaining of the second plurality of values, determining whether the second plurality of values deviates from the first plurality of values in an amount that is greater than a threshold, responsive to the determining of whether the second plurality of values deviates from the first plurality of values in the amount that is greater than the threshold indicating that the second plurality of values does not deviate from the first plurality of values in the amount that is greater than the threshold, obtaining a third plurality of values from the plurality of sensors, wherein the third plurality of values represents a second displacement of the antenna or the structure relative to the preferred orientation, and responsive to the determining of whether the second plurality of values deviates from the first plurality of values in the amount that is greater than the threshold indicating that the second plurality of values deviates from the first plurality of values in the amount that is greater than the threshold, causing at least one actuator of a plurality of actuators to engage in order to cause the antenna to assume a second orientation. Computing environment 400 can facilitate in whole or in part commanding an antenna to a first orientation relative to a structure that the antenna is mounted to, obtaining at least one measurement from at least one sensor, wherein the at least one measurement represents a first magnitude and a first direction of a displacement of the antenna relative to the first orientation, determining that the displacement of the antenna relative to the first orientation exceeds a threshold in terms of the first magnitude, the first direction, or a combination thereof, responsive to the determining that the displacement of the antenna relative to the first orientation exceeds the threshold, identifying at least one piezoelectric device to engage to cause the antenna to assume a second orientation relative to the structure, and responsive to the identifying, commanding the at least one piezoelectric device to engage to cause the antenna to assume the second orientation.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
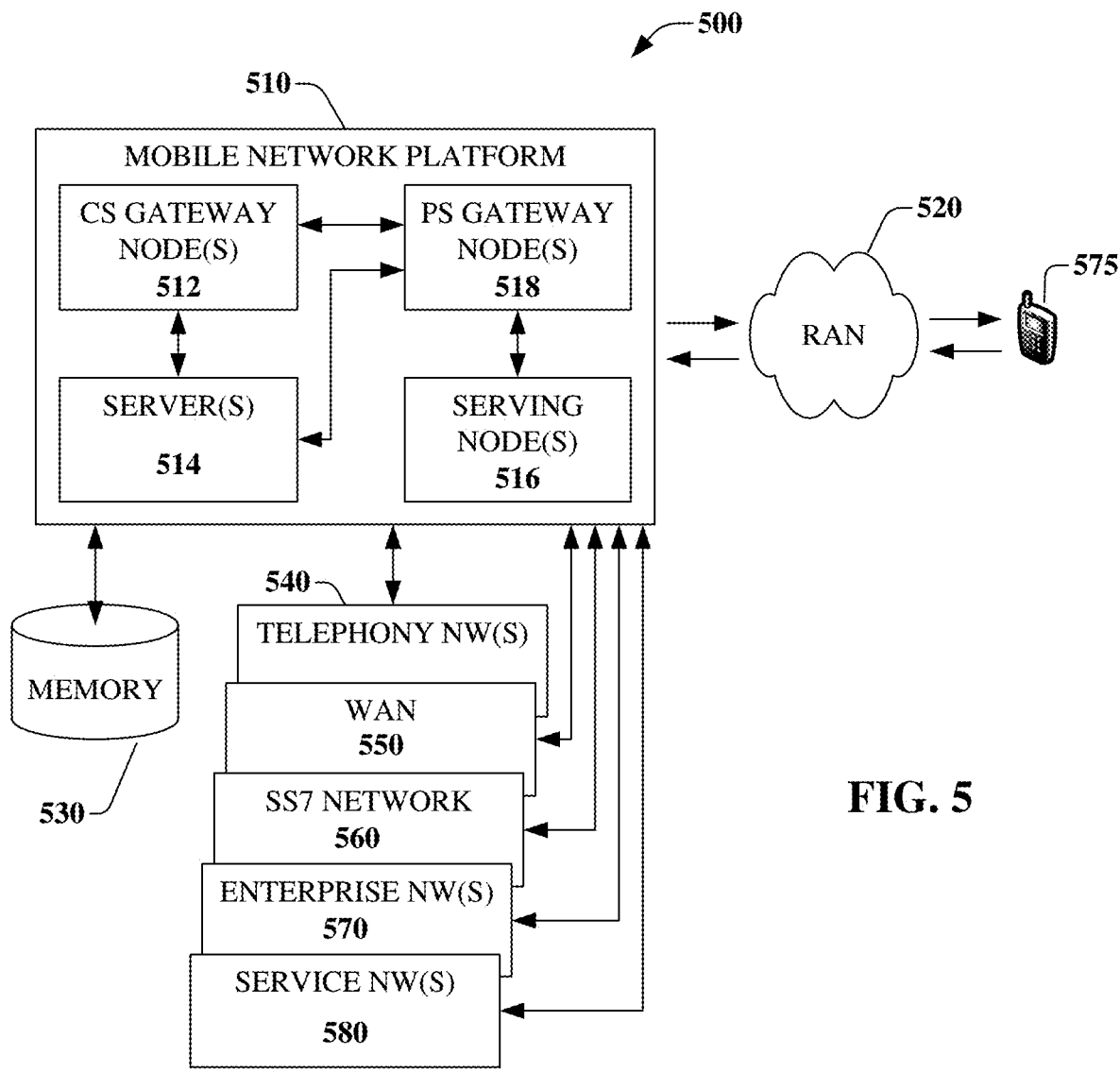
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part measuring at least one parameter of a communication link for a plurality of orientations of an antenna relative to a mounting structure that the antenna is mounted to, determining a preferred orientation included in the plurality of orientations based on the measuring of the at least one parameter, storing a first plurality of values obtained from a plurality of sensors responsive to the determining of the preferred orientation, wherein the first plurality of values correspond to the preferred orientation, subsequent to the storing of the first plurality of values, obtaining a second plurality of values from the plurality of sensors, wherein the second plurality of values represents a displacement of the antenna or the mounting structure relative to the preferred orientation, responsive to the obtaining of the second plurality of values, determining that the displacement of the antenna or the mounting structure relative to the preferred orientation is greater than a threshold, and responsive to the determining that the displacement of the antenna or the mounting structure relative to the preferred orientation is greater than the threshold, commanding at least one actuator of a plurality of actuators to engage in order to modify an orientation of the antenna relative to the mounting structure from a first orientation to a second orientation. Platform 510 can facilitate in whole or in part determining a preferred orientation for an antenna relative to a structure that the antenna is mounted to, wherein the determining of the preferred orientation is based on determining a maximum measurement included in a plurality of measurements, and wherein each of the plurality of measurements comprises a measurement of a signal strength of a signal received by the antenna, storing a first plurality of values corresponding to the preferred orientation, wherein the first plurality of values are obtained from a plurality of sensors, commanding the antenna to assume a first orientation subsequent to the storing of the first plurality of values, obtaining a second plurality of values from the plurality of sensors subsequent to the commanding of the antenna to assume the first orientation, wherein the second plurality of values represents a first displacement of the antenna or the structure relative to the preferred orientation, responsive to the obtaining of the second plurality of values, determining whether the second plurality of values deviates from the first plurality of values in an amount that is greater than a threshold, responsive to the determining of whether the second plurality of values deviates from the first plurality of values in the amount that is greater than the threshold indicating that the second plurality of values does not deviate from the first plurality of values in the amount that is greater than the threshold, obtaining a third plurality of values from the plurality of sensors, wherein the third plurality of values represents a second displacement of the antenna or the structure relative to the preferred orientation, and responsive to the determining of whether the second plurality of values deviates from the first plurality of values in the amount that is greater than the threshold indicating that the second plurality of values deviates from the first plurality of values in the amount that is greater than the threshold, causing at least one actuator of a plurality of actuators to engage in order to cause the antenna to assume a second orientation. Platform 510 can facilitate in whole or in part commanding an antenna to a first orientation relative to a structure that the antenna is mounted to, obtaining at least one measurement from at least one sensor, wherein the at least one measurement represents a first magnitude and a first direction of a displacement of the antenna relative to the first orientation, determining that the displacement of the antenna relative to the first orientation exceeds a threshold in terms of the first magnitude, the first direction, or a combination thereof, responsive to the determining that the displacement of the antenna relative to the first orientation exceeds the threshold, identifying at least one piezoelectric device to engage to cause the antenna to assume a second orientation relative to the structure, and responsive to the identifying, commanding the at least one piezoelectric device to engage to cause the antenna to assume the second orientation.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
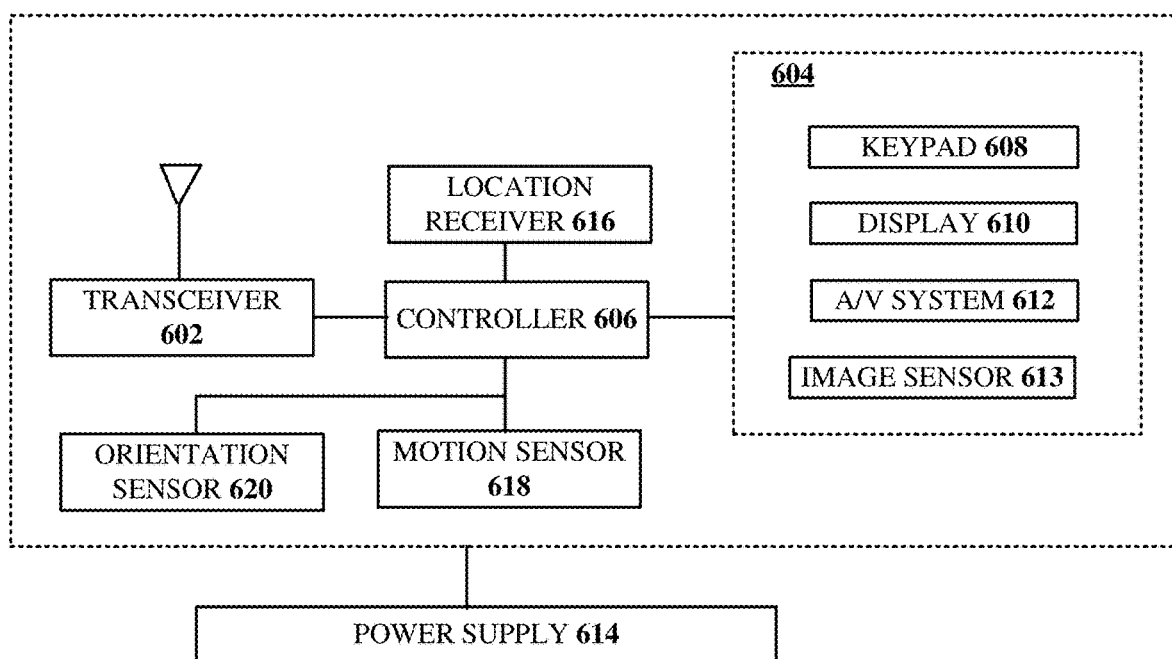
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part measuring at least one parameter of a communication link for a plurality of orientations of an antenna relative to a mounting structure that the antenna is mounted to, determining a preferred orientation included in the plurality of orientations based on the measuring of the at least one parameter, storing a first plurality of values obtained from a plurality of sensors responsive to the determining of the preferred orientation, wherein the first plurality of values correspond to the preferred orientation, subsequent to the storing of the first plurality of values, obtaining a second plurality of values from the plurality of sensors, wherein the second plurality of values represents a displacement of the antenna or the mounting structure relative to the preferred orientation, responsive to the obtaining of the second plurality of values, determining that the displacement of the antenna or the mounting structure relative to the preferred orientation is greater than a threshold, and responsive to the determining that the displacement of the antenna or the mounting structure relative to the preferred orientation is greater than the threshold, commanding at least one actuator of a plurality of actuators to engage in order to modify an orientation of the antenna relative to the mounting structure from a first orientation to a second orientation. Computing device 600 can facilitate in whole or in part determining a preferred orientation for an antenna relative to a structure that the antenna is mounted to, wherein the determining of the preferred orientation is based on determining a maximum measurement included in a plurality of measurements, and wherein each of the plurality of measurements comprises a measurement of a signal strength of a signal received by the antenna, storing a first plurality of values corresponding to the preferred orientation, wherein the first plurality of values are obtained from a plurality of sensors, commanding the antenna to assume a first orientation subsequent to the storing of the first plurality of values, obtaining a second plurality of values from the plurality of sensors subsequent to the commanding of the antenna to assume the first orientation, wherein the second plurality of values represents a first displacement of the antenna or the structure relative to the preferred orientation, responsive to the obtaining of the second plurality of values, determining whether the second plurality of values deviates from the first plurality of values in an amount that is greater than a threshold, responsive to the determining of whether the second plurality of values deviates from the first plurality of values in the amount that is greater than the threshold indicating that the second plurality of values does not deviate from the first plurality of values in the amount that is greater than the threshold, obtaining a third plurality of values from the plurality of sensors, wherein the third plurality of values represents a second displacement of the antenna or the structure relative to the preferred orientation, and responsive to the determining of whether the second plurality of values deviates from the first plurality of values in the amount that is greater than the threshold indicating that the second plurality of values deviates from the first plurality of values in the amount that is greater than the threshold, causing at least one actuator of a plurality of actuators to engage in order to cause the antenna to assume a second orientation. Computing device 600 can facilitate in whole or in part commanding an antenna to a first orientation relative to a structure that the antenna is mounted to, obtaining at least one measurement from at least one sensor, wherein the at least one measurement represents a first magnitude and a first direction of a displacement of the antenna relative to the first orientation, determining that the displacement of the antenna relative to the first orientation exceeds a threshold in terms of the first magnitude, the first direction, or a combination thereof, responsive to the determining that the displacement of the antenna relative to the first orientation exceeds the threshold, identifying at least one piezoelectric device to engage to cause the antenna to assume a second orientation relative to the structure, and responsive to the identifying, commanding the at least one piezoelectric device to engage to cause the antenna to assume the second orientation.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/

GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
a processing system including a processor; and
a memory that stores executable instructions that, when executed by the processing system, facilitate performance of operations, the operations comprising:

measuring at least one parameter of a communication link for a plurality of orientations of an antenna relative to a mounting structure that the antenna is mounted to, the measuring producing a first measurement;

determining a preferred orientation included in the plurality of orientations based on the first measurement;

storing a first plurality of values obtained from a plurality of sensors responsive to the determining of the preferred orientation, wherein the first plurality of values correspond to the preferred orientation;

subsequent to the storing of the first plurality of values, obtaining a second plurality of values from the plurality of sensors, wherein the second plurality of values represents a first displacement of the antenna or the mounting structure relative to the preferred orientation;

responsive to the obtaining of the second plurality of values, determining that the first displacement of the antenna or the mounting structure relative to the preferred orientation is greater than a displacement threshold;

responsive to the determining that the first displacement of the antenna or the mounting structure relative to the preferred orientation is greater than the displacement threshold, commanding at least one actuator of a plurality of actuators to engage in order to modify an orientation of the antenna relative to the mounting structure from a first orientation to a second orientation;

measuring the at least one parameter of the communication link to produce a second measurement;

determining from the second measurement that the second orientation is not at the preferred orientation; and determining that the at least one parameter satisfies a parameter threshold.

2. The device of claim 1, wherein the measuring of the at least one parameter comprises measuring a received signal strength of a pilot signal transmitted from a second antenna over the communication link.

3. The device of claim 2, wherein the determining of the preferred orientation is based on determining a maximum received signal strength of the pilot signal included in a plurality of received signal strengths, and wherein each of the plurality of received signal strengths correspond to a respective orientation of the antenna included in the plurality of orientations.

4. The device of claim 1, wherein the operations further comprise:
selecting a portion of the plurality of orientations based on an error rate of communications facilitated by the antenna being less than the displacement threshold.

5. The device of claim 1, wherein the operations comprise commanding the at least one actuator of the plurality of actuators to engage in order to modify the orientation of the antenna relative to the mounting structure from the second orientation to a third orientation.

6. The device of claim 1, wherein the second orientation is different from the preferred orientation.

7. The device of claim 1, wherein the operations further comprise:
calibrating a combination of the antenna, the plurality of sensors, and the plurality of actuators subsequent to the determining of the preferred orientation and prior to the obtaining of the second plurality of values.

8. The device of claim 7, wherein the calibrating comprises:
commanding a second displacement of the antenna relative to the preferred orientation;

obtaining a third plurality of values from the plurality of sensors responsive to the commanding of the second displacement of the antenna relative to the preferred orientation; and storing the third plurality of values in the memory.

9. The device of claim 8, wherein the determining that the first displacement of the antenna or the mounting structure relative to the preferred orientation is greater than the displacement threshold is based on determining that a match exists between the third plurality of values and the second plurality of values.

10. The device of claim 8, wherein the calibrating further comprises:
commanding a third displacement of the antenna relative to the preferred orientation subsequent to the commanding of the first displacement of the antenna relative to the preferred orientation;

obtaining a fourth plurality of values from the plurality of sensors responsive to the commanding of the third displacement of the antenna relative to the preferred orientation; and storing the fourth plurality of values in the memory.

11. The device of claim 10, wherein the determining that the first displacement of the antenna or the mounting structure relative to the preferred orientation is greater than the displacement threshold is based on determining that the third plurality of values and the fourth plurality of values are two of the closest matches stored in the memory relative to the second plurality of values, and wherein the commanding of the at least one actuator of the plurality of actuators to engage is based on an interpolation between the third plurality of values and the fourth plurality of values.

12. The device of claim 7, wherein the calibrating is performed over three dimensions.

13. The device of claim 7, wherein the calibrating is performed periodically, responsive to a detection of an event, or a combination thereof.

14. The device of claim 1, wherein each sensor of the plurality of sensors comprises an accelerometer, a gyroscope, or a combination thereof, and wherein each actuator of the plurality of actuators comprises a motor, a piezoelectric device, or a combination thereof.

15. The device of claim 1, wherein a first sensor of the plurality of sensors is paired with a first actuator of the plurality of actuators to form a first pair, wherein a second sensor of the plurality of sensors is paired with a second actuator of the plurality of actuators to form a second pair, and wherein a third sensor of the plurality of sensors is paired with a third actuator of the plurality of actuators to form a third pair, wherein the first pair is oriented along a first axis of a reference coordinate system, wherein the second pair is orientated along a second axis of the reference coordinate system, wherein the third pair is oriented along a third axis of the reference coordinate system, wherein the third axis is different from the second axis, wherein the third axis is different from the first axis, and wherein the second axis is different from the first axis.

16. A non-transitory, machine-readable medium, comprising executable instructions that, when executed by a processing system including a processor, facilitate performance of operations, the operations comprising:
determining a preferred orientation for an antenna relative to a structure that the antenna is mounted to, wherein the determining of the preferred orientation is based on determining a maximum measurement included in a plurality of measurements, and wherein each of the plurality of measurements comprises a measurement of a signal strength of a signal received by the antenna;

storing a first plurality of values corresponding to the preferred orientation, wherein the first plurality of values are obtained from a plurality of sensors;

commanding the antenna to assume a first orientation subsequent to the storing of the first plurality of values;

obtaining a second plurality of values from the plurality of sensors subsequent to the commanding of the antenna to assume the first orientation, wherein the second plurality of values represents a first displacement of the antenna or the structure relative to the preferred orientation;

responsive to the obtaining of the second plurality of values, determining whether the second plurality of values deviates from the first plurality of values in an amount that is greater than a displacement threshold;

responsive to the determining of whether the second plurality of values deviates from the first plurality of values in the amount that is greater than the displacement threshold indicating that the second plurality of values does not deviate from the first plurality of values in the amount that is greater than the displacement threshold, obtaining a third plurality of values from the plurality of sensors, wherein the third plurality of values represents a second displacement of the antenna or the structure relative to the preferred orientation; and responsive to the determining of whether the second plurality of values deviates from the first plurality of values in the amount that is greater than the displacement threshold indicating that the second plurality of values deviates from the first plurality of values in the amount that is greater than the displacement threshold, causing at least one actuator of a plurality of actuators to engage in order to cause the antenna to assume a second orientation.

17. The non-transitory, machine-readable medium of claim 16, wherein the causing of the at least one actuator of the plurality of actuators to engage comprises causing at least two actuators of the plurality of actuators to engage, wherein the first orientation the second orientation, and the preferred orientation are a same orientation.

18. The non-transitory, machine-readable medium of claim 16, wherein the displacement threshold is based on a power supply capacity that is available to the plurality of actuators, network traffic accommodated by the antenna, and a quality of service parameter associated with a communication device that is engaged in a communication session via the antenna.

19. A method, comprising:

commanding, by a processing system including a processor, an antenna to a first orientation relative to a structure that the antenna is mounted to;

obtaining, by the processing system, at least one measurement from at least one sensor, wherein the at least one measurement represents a first magnitude and a first direction of a displacement of the antenna relative to the first orientation;

determining, by the processing system, that the displacement of the antenna relative to the first orientation exceeds a displacement threshold in terms of the first magnitude, the first direction, or a combination thereof;

responsive to the determining that the displacement of the antenna relative to the first orientation exceeds the displacement threshold, identifying, by the processing system, at least one piezoelectric device to engage to cause the antenna to assume a second orientation relative to the structure;

responsive to the identifying, commanding, by the processing system, the at least one piezoelectric device to engage to cause the antenna to assume the second orientation;

measuring, by the processing system, at least one parameter of a communication link to produce a measurement;

determining, by the processing system, from the measurement that the second orientation is not at a preferred orientation; and determining, by the processing system, that the measurement satisfies a parameter threshold.

20. The method of claim 19, wherein the second orientation corresponds to the first orientation, and wherein the at least one measurement excludes a measurement of a communication signal.

* * * * *